(12) United States Patent
Brabaw

(10) Patent No.: US 7,152,794 B2
(45) Date of Patent: Dec. 26, 2006

(54) AUTOMATED BAR CODE LABEL CANCELLER, AND METHOD OF CANCELLING BAR CODES

(75) Inventor: Darren R. Brabaw, Harford Mills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1114 days.

(21) Appl. No.: 09/909,965

(22) Filed: Jul. 23, 2001

(65) Prior Publication Data

US 2003/0015592 A1    Jan. 23, 2003

(51) Int. Cl.
G06K 7/10 (2006.01)
G06K 15/00 (2006.01)
G06F 17/00 (2006.01)

(52) U.S. Cl. .................. 235/462.01; 235/462.13; 235/375

(58) Field of Classification Search ........ 235/494, 235/470, 462.01, 462.13
See application file for complete search history.

(56) References Cited

U.S. PATENT DOCUMENTS

| | | | | |
|---|---|---|---|---|
| 1,388,419 A | * | 8/1921 | Fitch | 432/137 |
| 3,541,289 A | * | 11/1970 | Peter | 219/700 |
| 3,646,880 A | * | 3/1972 | Norris | 99/349 |
| 4,143,810 A | * | 3/1979 | Greenaway | 235/487 |
| 4,424,245 A | | 1/1984 | Maruta et al. | |
| 4,611,601 A | * | 9/1986 | Bowman | 600/486 |
| 4,738,472 A | | 4/1988 | Shibata | |
| 4,788,419 A | * | 11/1988 | Walters et al. | 235/381 |
| 4,996,104 A | * | 2/1991 | Nicholas et al. | 428/323 |
| 5,109,153 A | * | 4/1992 | Johnsen et al. | 235/468 |
| 5,234,798 A | | 8/1993 | Heninger et al. | |
| 5,484,996 A | * | 1/1996 | Wood | 235/487 |
| 5,727,654 A | * | 3/1998 | Roessner et al. | 186/40 |
| 5,811,792 A | | 9/1998 | Verschuur et al. | |
| 5,940,637 A | * | 8/1999 | Manico et al. | 396/207 |
| 6,009,400 A | * | 12/1999 | Blackman | 705/1 |
| 6,214,623 B1 | * | 4/2001 | Simons et al. | 436/2 |
| 6,419,157 B1 | * | 7/2002 | Ehrhart et al. | 235/486 |
| 6,732,920 B1 | * | 5/2004 | Gatto et al. | 235/375 |

FOREIGN PATENT DOCUMENTS

| | | | | |
|---|---|---|---|---|
| GB | 2 390 592 A | * | 1/2004 | |
| JP | 5-19695 A | * | 1/1993 | |

* cited by examiner

*Primary Examiner*—Jared J. Fureman
(74) *Attorney, Agent, or Firm*—Schwartz & Weinrieb

(57) ABSTRACT

A method and apparatus for heat-treating a thermal-direct-printed bar code label, upon which a bar code has been pre-printed by previously exposing predetermined portions of the thermal-direct-printed bar code label to a predetermined temperature level, to a similar temperature level whereby the entire expanse of the bar code label becomes blackened thereby effectively rendering the bar code illegible and unreadable. Packaging containers, having the bar code labels affixed thereon, can therefore be heat-treated and then reused by having a new bar code label affixed thereto.

16 Claims, 2 Drawing Sheets

AUTOMATED BAR CODE LABEL CANCELLER, AND METHOD OF CANCELLING BAR CODES

FIELD OF THE INVENTION

The present invention relates generally to thermal, heat generating apparatus, and more particularly to a new and improved thermal, heat generating apparatus, and a method of using the same, for thermally exposing or heat-treating thermal-direct-printed labels, upon which bar codes have been previously printed, in order to render such bar codes illegible or non-readable whereby packaging containers, upon which such bar code labels have been affixed, can be reused for subsequent delivery or routing purposes or operations.

BACKGROUND OF THE INVENTION

Bar codes are conventionally used in various different industries for a variety of purposes. One conventional use of bar codes is for the identification and routing, transportation, or distribution of packages, articles, or the like, such as, for example, postal or courier system parcels, mail pieces, articles, or packages, by means of automated handling apparatus. In connection with such articles, parcels, or packages, it is often desired to reuse the actual packaging container, within which a particular article or object, which has been disposed, transported and delivered to its destination, has been housed or contained, such that the same packaging container can be reused in connection with the transportation and delivery of another parcel or package. However, in view of the fact that the particular packaging container has the original bar code label affixed thereon, wherein the bar code printed upon such label inherently defines, for example, the original package or parcel destination address, routing sequence, or the like, the original bar code label must firstly be removed from the packaging container, or alternatively, be rendered illegible or unreadable, such that the subsequently transported or conveyed article or object housed or contained within the previously used packaging container is in fact correctly or properly delivered to the new address or destination and not mistakenly delivered to the previous address or destination defined by means of the original bar code appearing upon the bar code label.

Prior art techniques or systems have therefore attempted to resolve the aforenoted difficulties encountered in connection with the reuse of packaging containers, however, for one reason or another, such prior art techniques or systems have not been commercially satisfactory. For example, in accordance with one known technique or system, it has been attempted to physically remove the bar code labels from the packaging containers, however, such procedures are time-consuming and often result in damage to the packaging containers. In accordance with another technique or system, the bar code labels are effectively rendered illegible or unreadable as a result of personnel physically writing over the bar code label by means of a pen or similar writing instrument whereby, for example, black or other dark color ink effectively obliterates the original bar code indicia. This method or technique, however, is also time consuming and tedious for operator personnel. Still yet further, in accordance with a system developed by Advanced Technology and Research Corporation, a camera detects the presence or location of the bar code label and an ink spray deposition system is triggered so as to spray ink over the label thereby effectively canceling the same. While such a system is operationally feasible and generally satisfactory, it is somewhat expensive due to the need for the provision of the camera system, air compressor means for spraying or dispersing the ink, and a control system for ensuring that the ink that is sprayed is in fact only applied to or sprayed upon the bar code label and not upon other regions of the packaging container. In addition, the application of the ink in spray form may present environmental problems.

A need therefore exists in the art for a new and improved method or process for canceling bar code labels by rendering the same illegible or unreadable, and a cancellation system for implementing the method, wherein the system and method are automatically implemented without the need for operator personnel to perform the actual cancellation process, wherein the packaging containers per se are not damaged and remain intact for subsequent reuse as desired, and wherein further, the system and process of the present invention does not present environmental problems.

OBJECTS OF THE INVENTION

Accordingly, it is an object of the present invention to provide a new and improved method, and a system or apparatus for implementing the same, for effectively canceling, or rendering illegible or unreadable, bar code indicia that has been formed or printed upon a bar code tag or label, which has been secured upon a packaging container housing or containing various articles or objects so as to automatically determine the destination, transportation, routing, delivery, or distribution sequence of such articles or objects, whereby the packaging containers per se can be readily rendered reusable.

Another object of the present invention is to provide a new and improved method, and a system or apparatus for implementing the same, for effectively canceling, or rendering illegible or unreadable, bar code indicia that has been formed or printed upon a bar code tag or label, which has been secured upon a packaging container housing or containing various articles or objects so as to automatically determine the destination, delivery, routing, transportation, or distribution sequence of such articles or objects, whereby the packaging containers per se can be readily rendered reusable without incurring the various operational disadvantages or drawbacks characteristic of PRIOR ART techniques or methods for cancelling bar code indicia upon bar code labels or tags.

An additional object of the present invention is to provide a new and improved method, and a system or apparatus for implementing the same, for effectively canceling, or rendering illegible or unreadable, bar code indicia that has been formed or printed upon a bar code tag or label, which has been secured upon a packaging container housing or containing various articles or objects so as to automatically determine the destination, delivery, routing, transportation, or distribution sequence of such articles or objects, whereby the packaging containers per se can be readily rendered reusable without causing any physical damage to the packaging containers.

A further object of the present invention is to provide a new and improved method, and a system or apparatus for implementing the same, for effectively canceling, or rendering illegible or unreadable, bar code indicia that has been formed or printed upon a bar code tag or label, which has been secured upon a packaging container housing or containing various articles or objects so as to automatically determine the destination, delivery, routing, transportation, or distribution sequence of such articles or objects, whereby the packaging containers per se can be readily rendered reusable, and wherein further, the apparatus or system, and method thereof, employed in accordance with the principles and teachings of the present invention is substantially economical to implement and does not require tedious operations to be performed by operator personnel.

A last object of the present invention is to provide a new and improved method, and a system or apparatus for implementing the same, for effectively canceling, or rendering illegible or unreadable, bar code indicia that has been formed or printed upon a bar code tag or label, which has been secured upon a packaging container housing or containing various articles or objects so as to automatically determine the destination, delivery, routing, transportation, or distribution sequence of such articles or objects, whereby the packaging containers per se can be readily rendered reusable, and wherein further, the apparatus or system employed in accordance with the principles and teachings of the present invention does not employ any operative components which might present environmental problems.

SUMMARY OF THE INVENTION

The foregoing and other objectives are achieved in accordance with the teachings and principles of the present invention through the provision of a new and improved method, and a system or apparatus for implementing the same, for effectively canceling, or rendering illegible or unreadable, bar code indicia that has been formed or printed upon a bar code tag or label, which has been secured upon a packaging container housing or containing various articles or objects so as to automatically determine the destination, delivery, routing, transportation, or distribution sequence of such articles or objects, whereby the packaging containers per se can be readily rendered reusable. In particular, in view of the recognition that bar code indicia can be readily formed or effectively printed upon thermal-direct-printed label stock by, for example, contacting such label stock with suitably variable or programmable heated platens, whereby those portions of the label stock, which are contacted or engaged by the heated platens, are accordingly heated and blackened so as to thereby define the particular bar code, then the packaging container, having the bar code label secured thereon, can subsequently, in effect, be uniformly heated throughout substantially the entire extent thereof whereby the entire bar code label is accordingly blackened. In view of the latter state of the bar code label, the bar code indicia originally present upon the bar code label is now rendered entirely illegible or unreadable. Accordingly, the packaging container upon which the original bar code label was secured can now be readily reused by simply securing a new bar code label, having new bar code indicia formed or printed thereon, onto the packaging container.

By means of the foregoing method or technique implemented in accordance with the principles and teachings of the present invention, the various operational drawbacks or disadvantages of PRIOR ART techniques or methods have been resolved. More particularly, the packaging containers can be rendered reusable without causing any damage to the existing packaging containers. In addition, the apparatus or system of the present invention is substantially economical to implement and does not utilize any components which might present environmental problems. Still further, tedious operations previously performed by operator personnel have been obviated and rendered unnecessary.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
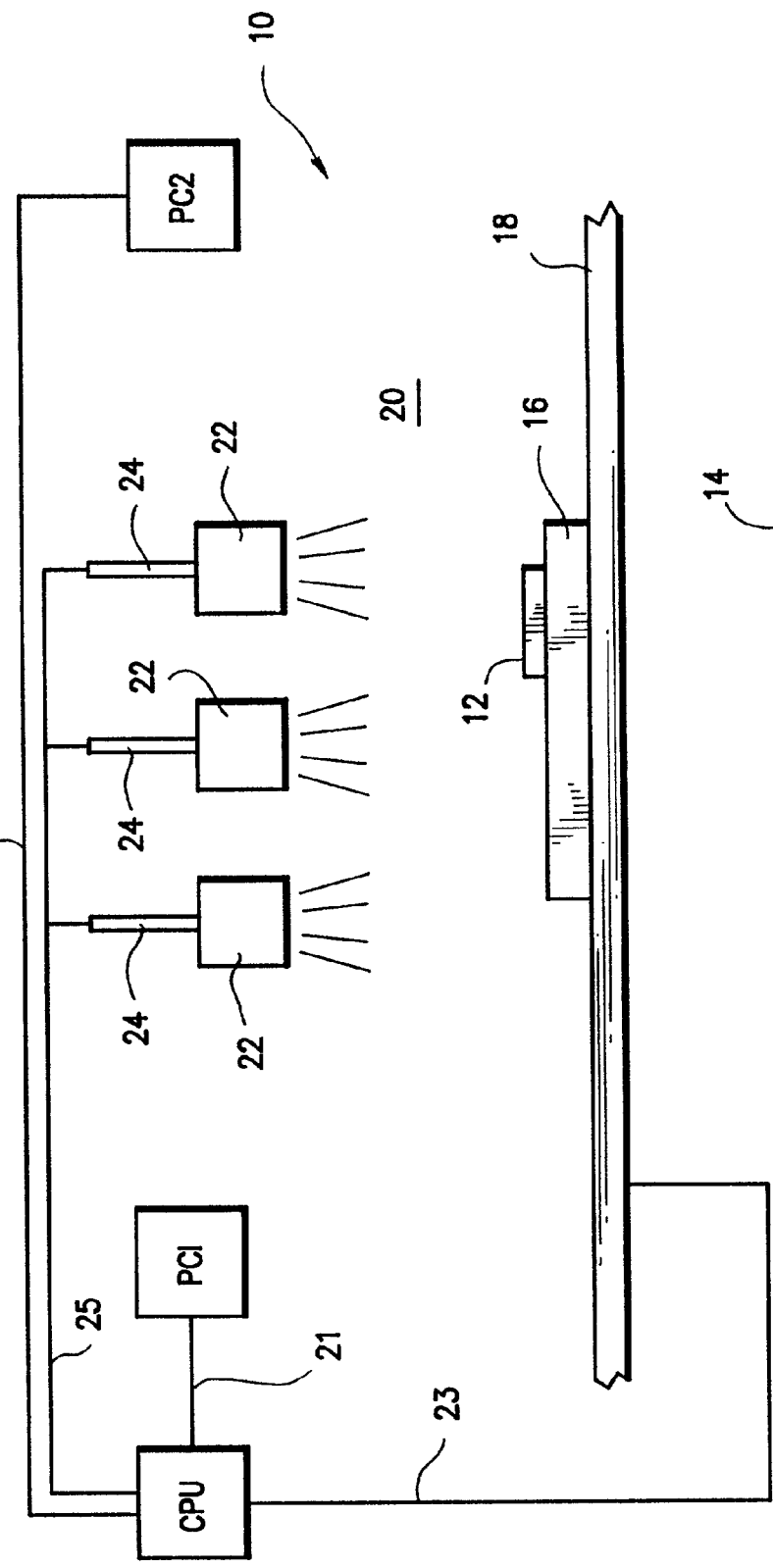
FIG. 1 is a schematic view of a first embodiment of a new and improved apparatus or system for performing the method of the present invention whereby previously fabricated bar code labels can effectively be cancelled or rendered illegible or unreadable by heat-treating the same such that the entire bar code label is blackened.

Referring now to the drawings, and more particularly to FIG. 1 thereof, a first embodiment of a new and improved apparatus or system, for performing the method of the present invention whereby a previously imprinted bar code, disposed upon a bar code label, can effectively be cancelled or rendered illegible or unreadable by exposing the entire bar code label to a requisite amount of heat such that the entire bar code label becomes blackened, is disclosed and is generally indicated by the reference character 10. As has been noted hereinbefore, one means or technique for effectively forming bar code indicia upon suitable stock material is to thermally form such bar code indicia upon thermal-direct-printed label stock material as disclosed, for example, in FIG. 2. More particularly, a blank, thermal-direct-printed stock material label 12 is contacted, in a predeterminedly controlled or programmed manner, by means of a plurality of heated platens, not shown, which are disposed within a predetermined array, whereby those portions of the label stock 12, which are actually contacted or engaged by the heated platens, not shown, are accordingly heated and blackened so as to thereby define the particular bar code 14 upon the bar code label 12. The bar code label 12, with the particular bar code indicia 14 imprinted thereon, can then be affixed or secured, for example, to a particular packaging container 16 such that the particular handling, transportation, routing, and delivery information inherently contained or defined within the bar code indicia 14 will be able to be utilized by automated systems or apparatus for handling, transporting, routing, and delivering the particular package, object, or article, contained or housed within the packaging container 16, to a particular delivery address. As has also been noted hereinbefore, once the particular package, object, or article housed or contained within the packaging container 16 has been properly handled, transported, routed, and delivered, it is often desired to reuse the actual packaging container 16 such that the same packaging container 16 can be used again in connection with the handling, transportation, routing, and delivery of another parcel or package. However, in view of the fact that the particular packaging container 16 has the original bar code label 12 affixed thereon, wherein the bar code indicia 14 printed upon such label 12 inherently defines, for example, the original package or parcel destination address, routing sequence, or the like, the original bar code label 12 must firstly be removed from the packaging container, which is not practical or desirable, or alternatively, must be rendered illegible or unreadable, such that the subsequently transported or conveyed article or object, contained or housed within the previously used packaging container 16, can in fact be properly or correctly delivered to a new address or destination, in accordance with the routing sequence or delivery address defined by means of a new bar code label which is to be affixed to the packaging container 16, and not mistakenly delivered to the previous address or destination defined by means of the original bar code indicia 14 appearing upon the bar code label 12.

Figure 2:
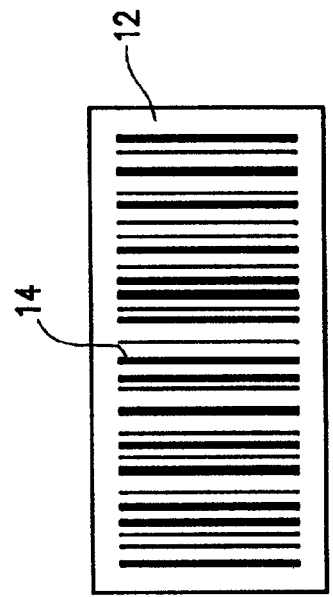
FIG. 2 is a schematic view of a bar code label, having an exemplary bar code imprinted thereon, of the type which can be affixed to a packaging container in order to automatically facilitate routing of the packaging container in accordance with automated handling, transporting, routing, and delivery systems.

In view of the fact that the bar code indicia is able to be formed or imprinted upon thermal-direct-printed label stock material by means of, in effect, the aforenoted heat-treatment of predetermined portions of the thermal-direct-printed label stock material by means of the heated platens, not shown, it has been additionally realized that by uniformly heating the packaging container, having the bar code label secured thereon, the bar code label can correspondingly be uniformly heated throughout substantially the entire extent thereof whereby the entire bar code label will accordingly be blackened. Consequently, in view of such status of the bar code label, the bar code indicia originally present upon the bar code label will now be rendered entirely illegible or unreadable. Accordingly, the packaging container, upon which the original bar code label was secured, can now be readily reused by simply securing a new bar code label, having new bar code indicia formed or printed thereon, onto the packaging container. The new and improved apparatus or system 10 as disclosed within FIG. 1 has therefore been especially developed for performing the method of the present invention whereby a previously imprinted bar code, such as that disclosed at 14 in FIG. 2, disposed upon a bar code label, such as that disclosed at 12 in FIG. 2, is exposed to a requisite amount of heat such that the entire bar code label 12 becomes blackened thereby effectively cancelling or rendering illegible or unreadable the entire bar code 14 appearing upon the bar code label 12.

More particularly, with reference again being made to FIG. 1, a first embodiment of a new and improved apparatus or system, for performing the aforenoted method of the present invention, is seen to comprise, for example, a conveyor mechanism 18 by means of which a packaging container 16, having a bar code label 12 affixed thereto, can be conveyed to a work station 20 at which the bar code label 12 will be subjected to the process of the present invention for rendering the bar code 14, previously imprinted upon the bar code label 12, illegible or unreadable. The conveyor mechanism 18 may be any conventional conveyor, such as, for example, a roller conveyor or a belt conveyor, and operatively associated with the conveyor mechanism 18, there is provided a first entry photocell system PC1 which detects the presence of the packaging container 16 as the same is conveyed toward the work station 20. The work station 20 is provided with a plurality of light or heat sources 22, which may be any one type of a multitude of light, heat or energy sources, for emitting a suitable type of light, heat, or energy which is capable of suitably heating the packaging container 16 to a predetermined temperature level. For example, and not by means of any limitation, each light, heat, or energy source 22 may comprise a conventional heat lamp, an infrared heater, a microwave generator, a hot air generator, a relatively low-level laser source, a heated platen, or the like.

The critical or requisite criteria resides in the fact that the particular light, heat, or energy source must be capable of generating sufficient heat such that the packaging container 16 is exposed or subjected to a predetermined temperature level which is within the range of 100–500° F. The reason for this is that it has been determined that depending upon the particular chemical composition comprising the particular thermal-direct-printed label stock material which was originally used to form a particular bar code label, the label stock material can be blackened, so as to develop the predetermined bar code thereon, as a result of exposing the label stock material to a temperature level which is within a temperature range of 100–500° F. As has been noted hereinbefore, in accordance with one instance or example, the original bar code 14, formed or imprinted upon the original bar code label 12, can in fact be generated as a result of the bar code label stock material being heat-treated by means of the aforenoted heated platens to a temperature level of approximately 450° F. during the bar code thermal-direct-printing operation. In other words, in this instance, the bar code label stock material becomes activated, so as to become blackened, at a temperature level of approximately 450° F.

Accordingly, if in accordance with the technique or process developed in accordance with the teachings and principles of the present invention, the entire bar code label 12 is to be blackened so as to render the bar code indicia 14 originally imprinted thereon illegible or unreadable, then the entire bar code label 12 must be exposed or subjected to the noted requisite temperature level of approximately 450° F. It is to be further noted and appreciated that while the bar code label stock material need only be exposed or subjected to the noted temperature level of approximately 450° F., it is possible that the light, heat, or energy sources 22 might be required to generate sufficient light, heat, or energy such that the temperature level within the ambient environment of the work station 20 is greater than 450° F. in order to in fact ensure that the temperature level to which the packaging container 16, and the bar code label 12 affixed thereon, is actually exposed or subjected is approximately 450° F.

With reference continuing to be made to FIG. 1, it is further seen that, in accordance with the principles and teachings of the new and improved apparatus or system 10 of the present invention, the first photocell system PC1 is operatively connected to a central processing unit CPU by means of a signal line 21, and accordingly, in light of the detection of the presence of the packaging container 16 by means of the first entry photocell system PC1, the first entry photocell system PC1 emits a suitable signal which is transmitted to the central processing unit CPU. As a result of receiving the signal emitted from the first entry photocell system PC1, the central processing unit accordingly maintains movement of the conveyor mechanism 18 for a predetermined period of time, by means of a suitable signal line 23, whereby the packaging container 16 is moved, in effect, toward the downstream end of the array of light, heat, or energy sources 22 at which time the movement of the conveyor mechanism 18 terminated. The central processing unit CPU also, at this time, sends a suitable signal to each one of the light, heat, or energy sources 22 by means of a signal line 25 so as to in fact energize the same for a predetermined period of time whereby the light, heat, or energy sources 22 can now perform a suitable heat treatment process upon the packaging container 16 such that the entire bar code label 12, having been subjected to the aforenoted requisite heat and temperature level, is now entirely blackened whereby the bar code 14 is accordingly rendered illegible or unreadable. Upon termination of the predetermined heat treatment processing time period, the central processing unit CPU again activates the conveyor mechanism 18 so as to discharge the packaging container 16 from the work station 20 whereby the packaging container 16 can be reused for a new or subsequent package or article handling, transportation, routing, and delivery operation in accordance with a new bar code label to be affixed thereto. Upon exiting from the work station 20, the heat-treated packaging container 16 will pass beneath a second exit photocell system PC2 whereupon the second exit photocell system PC2 will emit a suitable control signal which is transmitted to the central processing unit CPU by means of signal line 27. As a result of receiving the signal from the second exit photocell system PC2, the central processing unit CPU in turn sends a suitable signal to the light, heat, or energy sources 22 so as to terminate energization of the same. Since the conveyor mechanism 18 has again been activated so as to discharge the previously heat-treated packaging container 16, the conveyor mechanism 18 may deliver a subsequent upstream packaging container such that a new heat-treatment operational cycle can be performed with respect to such subsequent upstream packaging container. It is to be noted that if a subsequent packaging container 16 is not present upon the conveyor 18, the conveyor 18 will continue to operate, however, since no new packaging container 16 has been detected by means of the first entry photocell system PC1, the heat sources 22 are not yet energized.

It is also noted in conjunction with the light, heat, or energy sources 22 that each light, heat, or energy source 22 is mounted upon a movably extensible/contractible mounting system 24 whereby each one of the light, heat, or energy sources 22 can be moved toward and away from the particular packaging container 16 disposed at the work station 20 so as to suitably alter the relative disposition of each light, heat, or energy source 22 with respect to the packaging container 16 in order to optimize the thermal heating of the same. Still further, or more particularly, it is to be appreciated that if the particular light, heat, or energy source 22 comprises, for example, a heated platen, the heated platen can in fact be disposed in contact with the packaging container 16 so as to act directly upon the bar code label 12 affixed thereto. The actual movement of the light, heat, or energy sources 22 can of course be suitably controlled through means of the central processing unit CPU and signal line 25.

Figure 3:
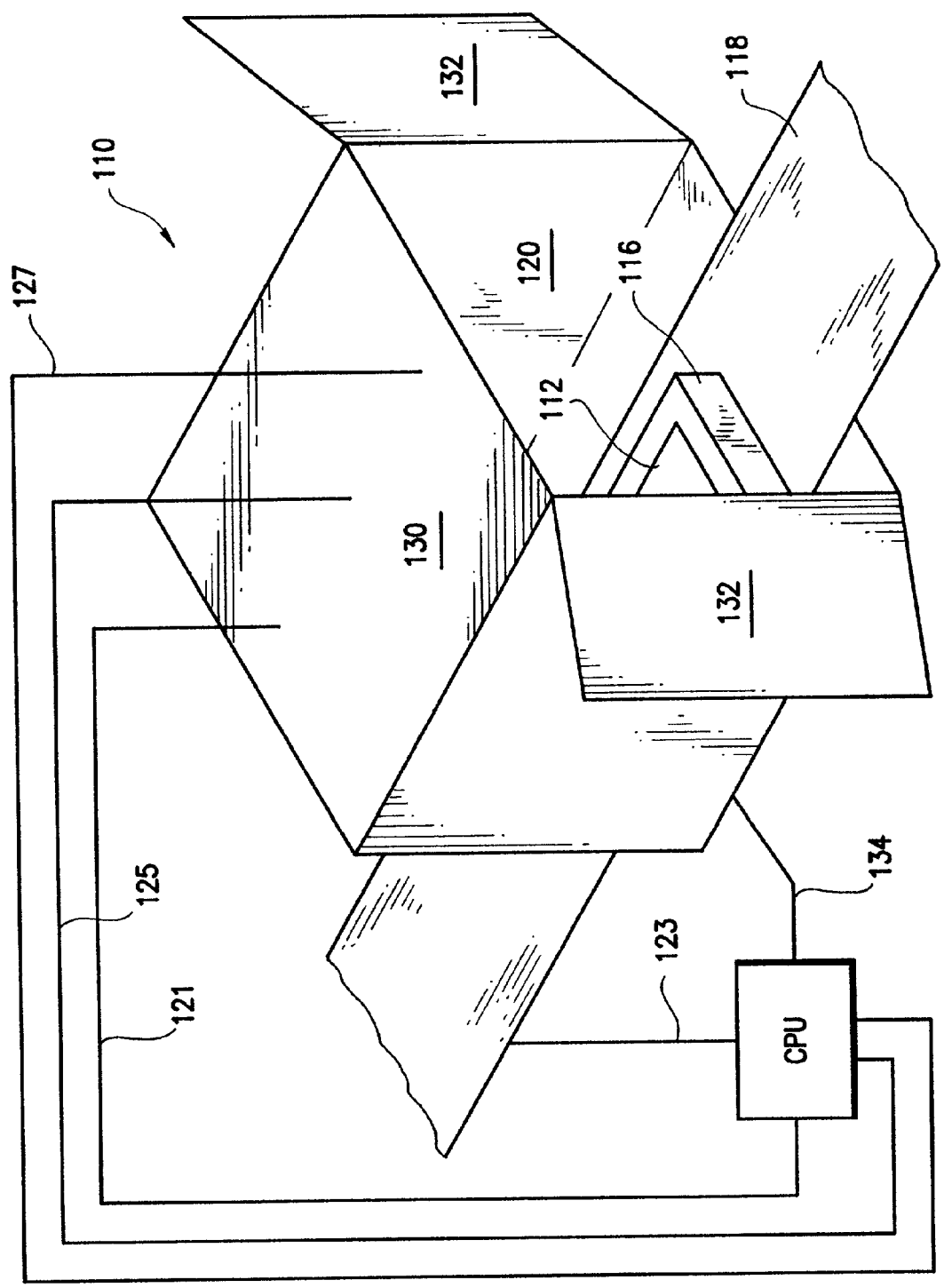
FIG. 3 is a schematic view similar to that of FIG. 1 showing, however, a second embodiment of a new and improved apparatus or system for performing the method of the present invention whereby previously fabricated bar code labels can likewise effectively be cancelled or rendered illegible or unreadable by heat-treating the same such that the entire bar code label is blackened.

Referring now to FIG. 3, a second embodiment of a new and improved apparatus or system, for performing the aforenoted method of the present invention whereby a previously imprinted bar code, disposed upon a bar code label, can effectively be cancelled or rendered illegible or unreadable by exposing the entire bar code label to a requisite amount of heat such that the entire bar code label becomes blackened, is disclosed and is generally indicated by the reference character 110. The operation of this second embodiment system 110 of the present invention is substantially the same as that of the first embodiment system 10 of the present invention, although the overall structure of the second embodiment system 110 is somewhat different, and therefore a detailed description of such second embodiment system 110 will be omitted for brevity purposes, the discussion of the same being confined to the primary differences existing between the two embodiment systems 10 and 110. In addition, it is also to be noted that component parts of the second embodiment system 110, which correspond to similar component parts of the first embodiment system 10, will be designated by corresponding reference numerals except that the reference numerals for the second embodiment system 110 will be within the 100 series.

Accordingly, with reference being made to FIG. 3, it is seen that in lieu of, in effect, an open heat treatment system such as that comprising the first embodiment heat treatment system 10 disclosed in FIG. 1, the second embodiment heat treatment system 110 is seen to comprise, in effect, an enclosed heat treatment system wherein the conveyor mechanism 118, carrying the packaging container 116 to be heat-treated, is conveyed through an oven-type enclosure 130. The system 110 also comprises a central processing unit CPU, and in a manner similar to that of the first embodiment heat-treatment system 10, the central processing unit CPU is operatively connected to the conveyor mechanism 118 by means of signal line 123. Still further, the central processing unit CPU has operatively associated therewith signal lines 121, 125, and 127 for respective operative connection, through means of enclosure 130, to a first entry photocell system, not shown, but disposed within enclosure 130, to a plurality of heat, light, or energy sources, also not shown, but disposed within the enclosure 130, and to a second exit photocell system, also not shown, but disposed within the enclosure 130. It is additionally noted that the oven-type enclosure 130 may have door closures 132 mounted upon the opposite entry and exit ends thereof, although only the door closures 132 mounted upon the exit end of the enclosure 130 are shown, and the central processing unit CPU is also operatively connected to the enclosure 130 by means of a signal line 134 so as to operatively control the opening and closing of the door closures 132 in conjunction with a heat-treatment cycle. More particularly, the door closures 132 will be moved to their opened positions so as to respectively permit the entry and discharge of a particular packaging container 116 into and out from the enclosure 130 prior to and upon termination of the heat-treatment cycle, and of course, the door closures 132 will be moved to their closed positions so as to substantially enclose the work station 120 during a heat-treatment operation cycle.

Thus, it may be seen that in accordance with the principles and teachings of the present invention, a new and improved heat-treatment method or process for canceling bar code labels by blackening the same and thereby rendering them illegible or unreadable, and a cancellation system for implementing the method, has been developed wherein the system and method are automatically implemented without the need for operator personnel to perform the actual cancellation process whereby tedious and time-consuming manpower operations are obviated. In addition, the packaging containers per se are not damaged and remain intact for subsequent reuse, as desired, by simply being readied for a new or subsequent bar code indicia label being secured thereto. Lastly, it is also noted that the system and process of the present invention do not present environmental problems.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A method of cancelling a bar code, previously imprinted upon a thermal-direct-printed bar code label as a result of exposing predetermined portions of said thermal-direct-printed bar code label to a predetermined temperature level whereby said predetermined exposed portions of said thermal-direct-printed bar code label become activated and blackened, and wherein said bar code label has been subsequently affixed upon a packaging container, comprising the steps of:

providing a work station;

providing a heat source, capable of generating sufficient heat such that an object disposed within the vicinity of said heat source will be heated to said predetermined temperature level, at said work station;

actuating a conveyor so as to convey a packaging container, having a thermal-direct-printed bar code label affixed thereon and comprising a bar code pre-printed thereon as a result of thermal activation at said predetermined temperature level, to said work station;

deactuating said conveyor so as to terminate conveyance of said conveyor so as to dispose said packaging container at said work station;

actuating said heat source such that the entire expanse of said thermal-direct-printed bar code label is exposed to said heat source so as to heat said entire expanse of said thermal-direct-printed bar code label to said predetermined temperature level such that said entire expanse of said thermal-direct-printed bar code label becomes blackened so as to thereby render said bar code, pre-printed upon said thermal-direct-printed bar code label, illegible and unreadable whereby said packaging container can be reused by affixing a new bar code label thereon; and reactuating said conveyor so as to discharge said packaging container from said work station.

2. The method as set forth in claim 1, further comprising the step of:

heating said bar code label to said predetermined temperature level which is within the range of 100–500° F.

3. The method as set forth in claim 1 further comprising the step of:

using a heat source which is selected form the group comprising a heat lamp, an infrared heater, a microwave generator, a hot air generator, a laser source, and a heated platen.

4. The method as set forth in claim 1, further comprising the step of:

using a plurality of heating elements as said heat source disposed at said work station.

5. The method as set forth in claim 1, further comprising the step of:

providing first and second entry and exit photo-cell systems operatively associated with said conveyor for controlling the conveyance of said packaging container upon said conveyor into and out from said work station.

6. The method as set forth in claim 5, further comprising the step of:

providing a central processing unit (CPU) for controlling said conveyor in response to signals from said first and second photocell systems, and for respectively controlling energization and de-energization of said heat source when said packaging container is disposed at said work station, and when said packaging container is absent from said work station.

7. The method as set forth in claim 1, further comprising the step of:

forming said work station as an oven-type enclosure; and conveying said packaging container through said oven-type enclosure.

8. Apparatus for causing the cancellation of a bar code, previously imprinted upon a thermal-direct-printed bar code label as a result of exposing predetermined portions of said thermal-direct-printed bar code label to a predetermined temperature level whereby said predetermined exposed portions of said thermal-direct-printed bar code label become thermally activated and blackened, and wherein said bar code label has been subsequently affixed upon a packaging container, comprising:

a work station;

a heat source disposed at said work station;

conveyor means for conveying a packaging container, having affixed thereon a thermal-direct-printed bar code label which comprises a bar code preprinted thereon as a result of predetermined portions of said thermal-direct-printed bar code label having been subjected to thermal activation at a predetermined temperature level, to said work station; and means for controlling said conveyor means so as to initially terminate conveyance of said conveyor so as to dispose the packaging container at said work station for a predetermined period of time so as to permit said heat source to heat the entire expanse of said thermal-direct-printed bar code label to said predetermined temperature level such that said entire expanse of said thermal-direct-printed bar code label becomes blackened so as to thereby render said bar code, preprinted upon said thermal-direct-printed bar code label, illegible and unreadable whereby the packaging container can be reused by affixing a new bar code label thereon, and for subsequently resuming conveyance of said conveyor means, after the packaging container has been subjected to said heat from said heat source whereby said entire expanse of said thermal-direct-printed bar code label has been blackened so as to thereby render said bar code, preprinted upon said thermal-direct-printed bar code label, illegible and unreadable, so as to discharge said packaging container from said work station.

9. The apparatus as set forth in claim 8, wherein:

said predetermined temperature level is within the range of 100–500° F.

10. The apparatus as set forth in claim 8, wherein:

said heat source comprises a heat source chosen from the group comprising a heat lamp, an infrared heater, a microwave generator, a hot air generator, a laser source, and a heated platen.

11. The apparatus as set forth in claim 10, wherein:

said heat source comprises at least one heated platen; and said at least one heated platen is mounted upon a movable support so as to be movable toward and away from said packaging container.

12. The apparatus as set forth in claim 8, wherein:

said heat source comprises a plurality of heating elements disposed at said work station.

13. The apparatus as set forth in claim 8, further comprising:

first and second entry and exit photocell systems operatively associated with said conveyor means for controlling the conveyance of the packaging container upon said conveyor means into and out from said work station.

14. The apparatus as set forth in claim 13, wherein said means for controlling said conveyor means comprises:
  a central processing unit (CPU) for controlling said conveyor in response to signals from said first and second photocell systems.

15. The apparatus as set forth in claim 13, wherein said central processing unit (CPU) comprises:
  means for respectively controlling energization and de-energization of said heat source, when said packaging container is disposed at said work station, and when said packaging container is absent from said work station, in response to signals from said first and second photocell systems.

16. The apparatus as set forth in claim 8, wherein:
  said work station comprises an oven-type enclosure; and
  said conveyor means conveys said packaging container through said oven-type enclosure.

* * * * *